Inventors
CHARLES WILLIAM EARP
CHARLES ERIC STRONG
By [signature]
Attorney

Sept. 12, 1950 C. W. EARP ET AL 2,521,702

RADIO NAVIGATIONAL SYSTEM

Filed Aug. 4, 1945 4 Sheets-Sheet 2

Inventors
CHARLES WILLIAM EARP
CHARLES ERIC STRONG
By E. D. Phinney
Attorney

Inventor
Charles William Earp.
Charles Eric Strong.
By [signature]
Attorney

Inventor
CHARLES WILLIAM EARP.
CHARLES ERIC STRONG
By E. D. Phinney
Attorney

Patented Sept. 12, 1950

2,521,702

UNITED STATES PATENT OFFICE 2,521,702

RADIO NAVIGATIONAL SYSTEM

Charles William Earp and Charles Eric Strong, London, England, assignors, by mesne assignments, to International Standard Electric Corporation, New York, N. Y., a corporation of Delaware Application August 4, 1945, Serial No. 608,956
In Great Britain August 4, 1944

7 Claims. (Cl. 343—102)

The present invention relates to radio navigational systems.

Radio navigational systems are used amongst other purposes for guiding a mobile radio receiver of suitable type along a specified path, for example a glide path or approach path or for enabling a suitable radio receiver to obtain its bearing with respect to a transmitting beacon or to obtain the direction of propagation of the received electromagnetic waves. Hitherto radio navigational systems have used radiations which are distinguished or characterised by amplitude modulations. Systems of this type suffer from one great disadvantage, namely the presence of interference in the receiver due to other amplitude modulated transmissions. Such interference cannot be eliminated except by the use of different frequencies for different beacons, but even so there may be similar interference due to other radiating systems. This type of interference is the same as the well-known heterodyne interference obtained between broadcast entertainment signals of the amplitude modulated type when two or more transmitting stations operate on the same or adjacent frequencies.

It is now well established that a number of broadcast transmitters utilising phase or frequency modulation can operate on the same carrier frequency and each dominate in its own service area. The heterodyne interference in the service area is eliminated entirely by the use of a receiver amplitude limiter. Thus in such a system which is able to transmit intelligence while maintaining the amplitude of the radiated waves constant, an amplitude limiter may be used in the receiver to eliminate any interference by a weak signal.

It is an object of this invention to apply the principles of frequency or phase modulation reception to radio navigational systems so as to gain for such systems all the advantages of frequency or phase modulation reception and thereby enable a plurality of radio beacons to utilise the same transmission frequency.

It will be observed that as regards radio navigational systems it is not possible to radiate frequency or phase modulation directly since the modulation would be the same in all directions and at all locations in space.

According to the present invention the object hereinbefore stated is accomplished by setting up at the receiver a phase or frequency modulation a characteristic of which is indicative of the receiver location in space. Such characteristic may be the phase of the sweep relative to a comparison wave. The sweep is the cyclic variation of the frequency or phase modulation. This phase or frequency modulation may be effected from the transmitter or at the receiver by the receiving system itself.

In order to render the invention clearer, several radio navigational systems embodying the invention will now be described with reference to the accompanying drawings in which.

Figure 6:
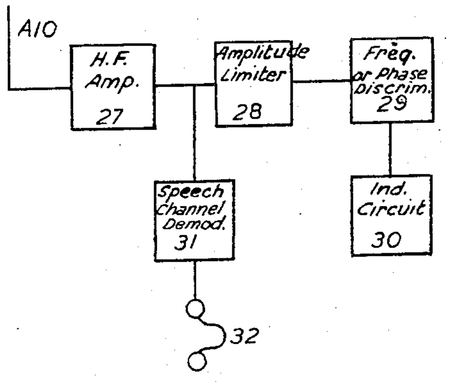
Figure 6 shows in block schematic a receiver for use with a beacon of the type shown in Figure 5.
Figure 7:
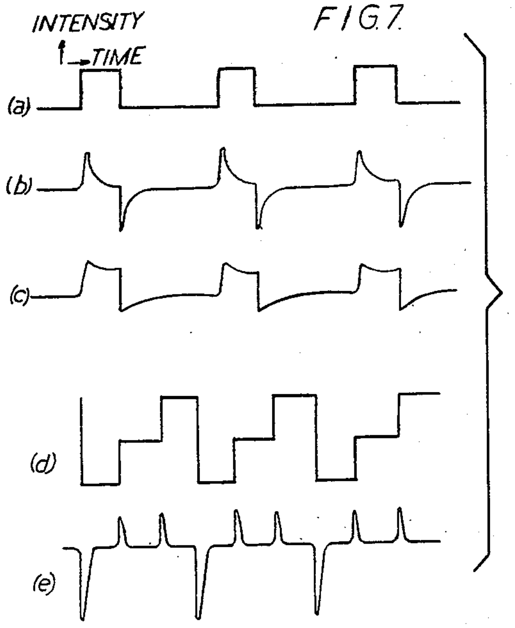
Figure 8:
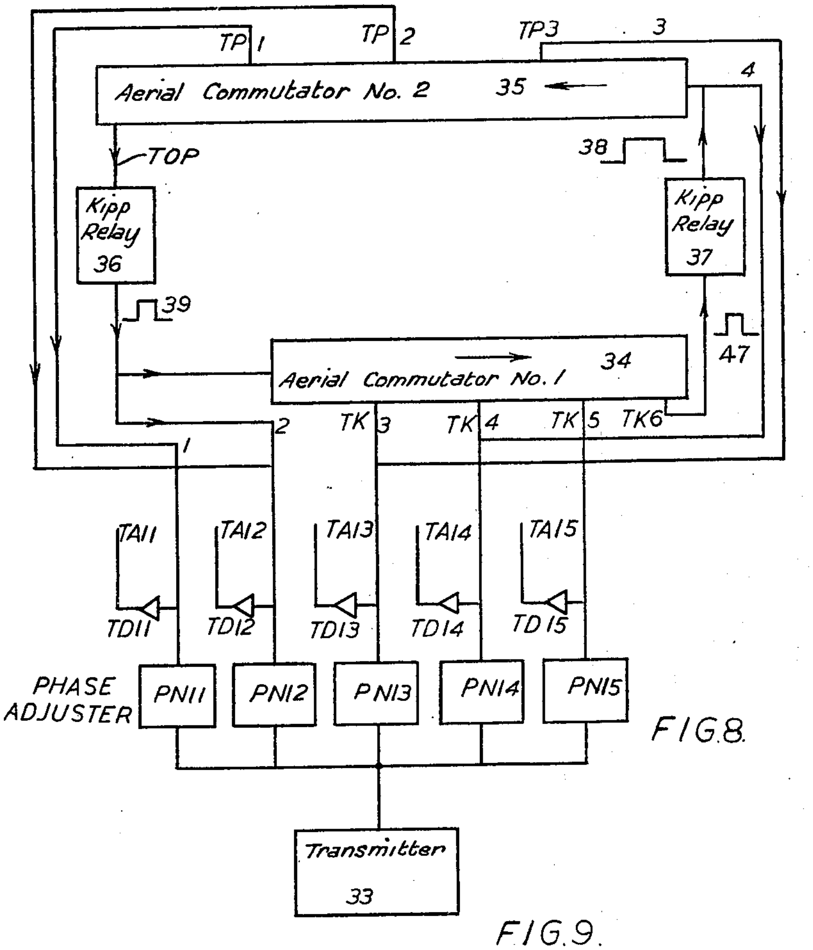

Figure 7 comprises various curves used in the description of Figure 6;

Figure 8 shows in block schematic form a further embodiment of the invention in a transmitter for defining a precise course for aircraft in a horizontal plane or glide path in a vertical plane.

Figure 10:
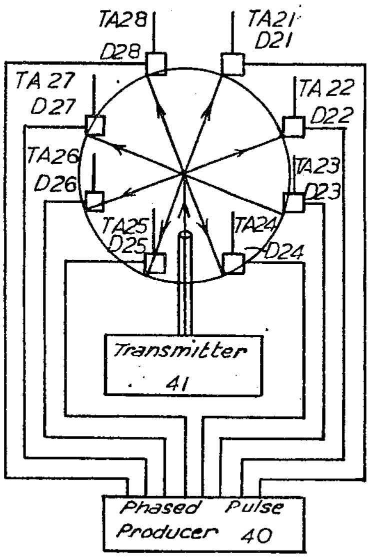
Figure 11:
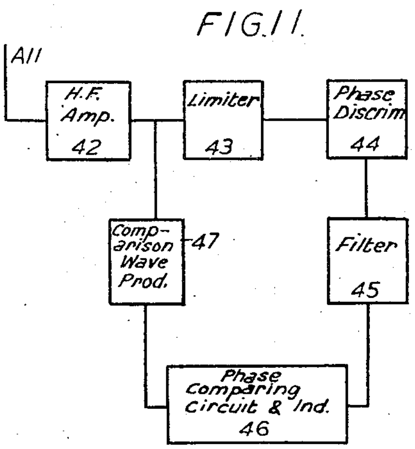
Figure 9:
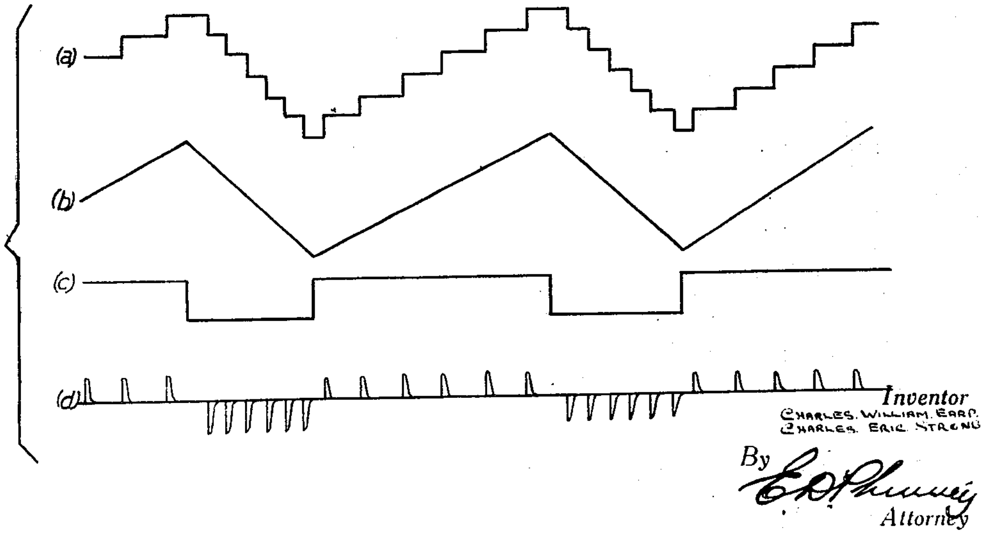

Figure 9 comprises various curves used in the description of Figure 8;

Figure 10 illustrates a further embodiment of the invention in an omni-directional beacon, and Figure 11 shows in block schematic form a receiver for use with a beacon of the type shown in Figure 10 for obtaining bearing indications of the receiver with respect to the beacon.

Figure 1:
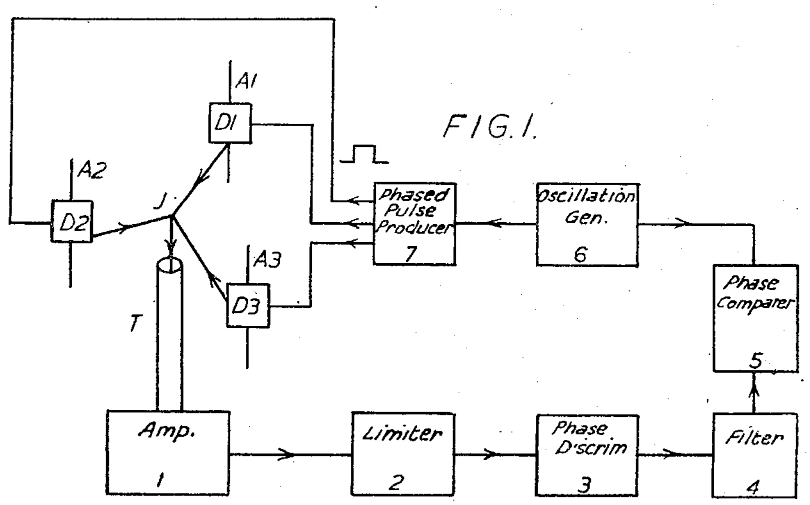
Figure 1 is a diagrammatic representation of one embodiment of the present invention in which the phase modulation is effected at the receiver, namely an automatic direction finder or radio compass arrangement.

Figure 1 illustrates an embodiment of the invention wherein the frequency or phase modulation is effected at the receiver for determining the direction of propagation of the received electromagnetic waves and consequently the bearing of a receiver with respect to the transmitting beacon from which the received waves emanate. The receiver may of course be mobile and the transmitter stationary or the receiver may be stationary and the transmitter mobile, for example, carried by an aircraft, or both receiver and transmitter may be mobile, as in the case of two aircraft or two ships.

In the example to be described the receiver antenna system comprises a plurality of antenna arranged in a circle. Three antennae A1, A2, A3 are shown by way of illustration but any greater number may be provided. It is assumed the transmitting beacon radiates waves of constant frequency and phase. These antennae are connected cyclically and successively to the radio receiver by means which will be described presently, and thus the signal fed to the receiver comprises a wave whose phase is suddenly changed at the change of antenna connection to the receiver, and the magnitude of the phase change depends upon the position in the antenna system of the antenna connected at the moment to the receiver with respect to the direction of propagation of the received waves.

The receiver is illustrated as comprising an amplifier represented by block 1, an amplitude limiter represented by block 2 and a phase or frequency discriminator represented by block 3 and a filter circuit represented by block 4. A phase comparison instrument and indicator is represented by block 5. Block 6 represents a source of oscillations which controls, as will be seen hereinafter the commutation of the antennae A1, A2, and A3 and is therefore convenient as the source of a comparison wave, which is fed to the phase comparer 5 together with the output from filter 4. Block 7 represents a device for producing time phased pulses from the oscillations from 6, there being, per cycle of the oscillations from 6, a pulse for each antenna A1–A3. In an alternative arrangement, 7 may be a pulse generator and 6 an arrangement for producing the appropriate subharmonic of the pulse frequency.

The pulses in the output of 7 are preferably pulses of rectangular waveform.

Figures 2, 3, 4:
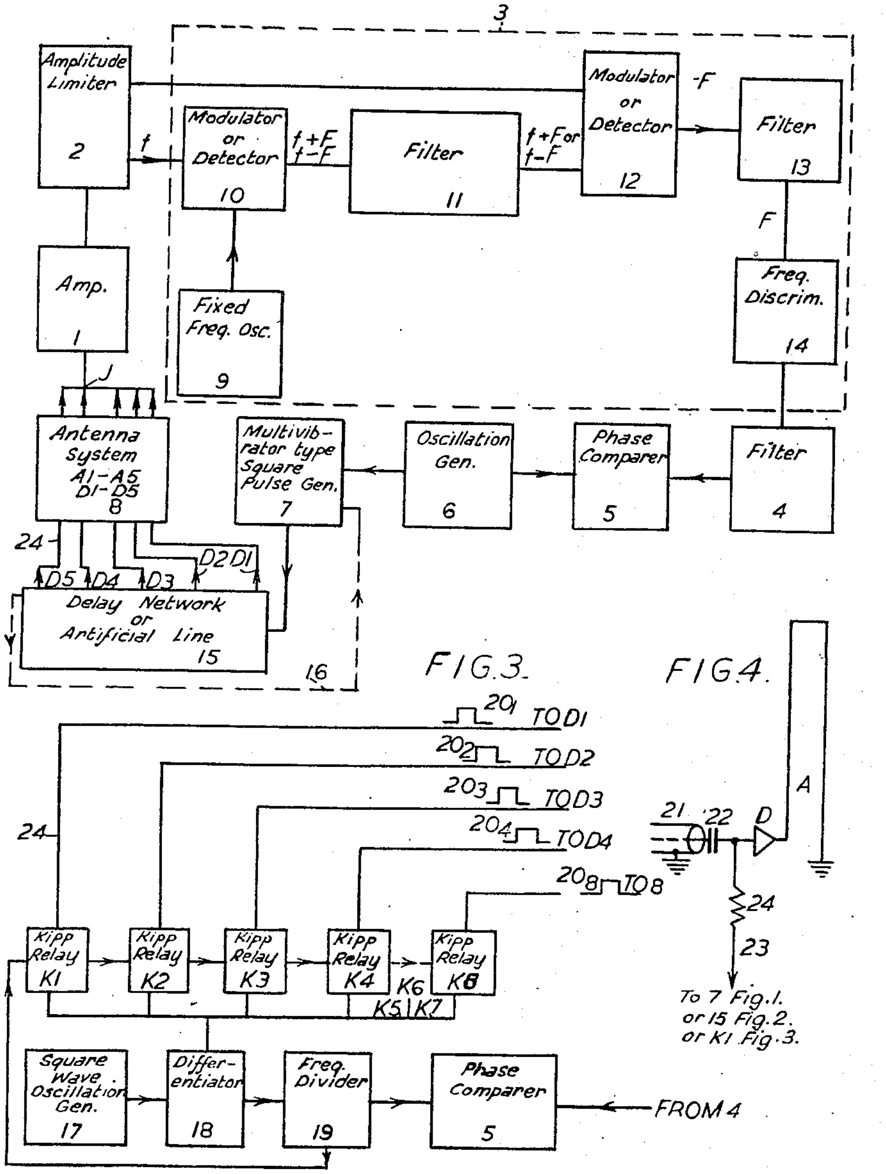
Figure 2 shows in block schematic a more detail arrangement of the receiver of an automatic radio direction finder embodying the invention.
Figure 3 shows in block schematic a detail arrangement of an item of Figure 1 and an alternative to a portion of the arrangement shown in Figure 2.
Figure 4 illustrates one form of antenna commutating arrangement.

The arrangements for commutating the antennae A1–A3 or switching them cyclically and successively to connect them to the amplifier 1 of the receiver, comprise respective detectors D1, D2, D3 which are normally non-conducting and are connected in series with their associated antennae as shown in more detail in Figure 4. The pulses from 7 relatively phased with respect to each other are applied to the detectors D1, D2, D3 so as to make them conducting for the duration of the pulse and hence connect the antennae in turn to the amplifier 1.

In the case of a simple "homing device" only two aerials are necessary. When automatic direction finding is required, three or more aerials are required, when they will preferably be arranged at equal intervals around the circumference of a circle.

The input to amplifier 1 is therefore a succession of closely but equally spaced pulses of the frequency of the received waves, the pulses having approximately equal amplitudes. The pulses of received waves are required to be of equal amplitude, but owing to practical imperfections such as unequal aerials, detectors or pulses from 7—or owing to interaction between aerials, they are not exactly so. The received wave train is therefore subjected to the action of amplitude limiter 2.

Output from 2 is of constant amplitude, but the phase of the waves is subjected to sudden changes at the instants of changeover from one aerial to the next, the amounts of phase change depending upon aerial spacing, and the direction of arrival of the received waves.

The phase discriminator 3, is identical to any phase demodulating or frequency demodulating detector well known in the art of frequency modulation communication systems. Here, if desired, the phase modulation of the received waves can be considered as frequency modulation by a waveform which is the time-differential of the phase modulation wave-form, so that output from 3 contains all the frequencies contained in the original phase modulation, the phase of each frequency component being modified by 90 degrees.

The phase pattern is cyclic at the frequency of the generator 6, and output from discriminator 3 therefore contains this frequency, which is filtered by filter 4 to produce a sine-wave. Phase comparison with oscillation wave from 6 serves to indicate the direction of propagation of the received waves in the following manner.

In the case where two aerials, only, are used, phase modulation of the received waves is inverted in sense according to which aerial is the more advanced in the direction of propagation of the received waves. When the two aerials are broadside to the wave-front, no frequency or phase modulation is produced. Output from the receiver filter 4 is arranged to be in-phase or anti-phase with output from 6, and the phase comparer 5 may then be a simple left-right indicator, or dynamometer course meter.

Thus the arrangement illustrated in Figure 1 utilising two fixed aerials on an aircraft may be used as a "homing" arrangement for the aircraft, by turning the aircraft so that the two aerials are always broadside to the wave front received, which is indicated by the meter 5 reading zero. Alternatively, utilising two aerials rotatable as a system, the arrangements illustrated in Figure 1 may be used for determining the bearing of the aircraft carrying the receiver, by rotating the aerial system until the meter 5 indicates zero, the bearing being indicated by means of a compass scale associated with the rotatable aerial system in known manner.

When three or more aerials are used equally spaced around a circle, the phase of the phase modulation sweep of the received waves produced by the commutation of the aerials varies directly according to the direction of propagation of the received waves with respect to the aerial system. It is then desirable that the discriminator or demodulator 3 gives an output whose amplitude varies linearly with phase change of the input waves, in order to obtain a bearing indication without error on the phase indicator 5.

When using a phase demodulator of a phase modulation communication system, output from the discriminator due to a phase transient is proportional to the "sine" of the phase angle, so that for adjacent-antenna spacing of more than 70 electrical degrees (that is $\lambda/5$ approx. $\lambda$=operating wave length), there is some distortion of demodulation. The effect of this distortion in the present use of determining bearing is to produce an error which is equivalent to the well-known "octantal" error of the orthodox Adcock Direction Finding System. When four aerials are used in the present case, the error is octantal, and in order that this error shall not be serious, adjacent aerials should not be spaced by more than about $$\frac{\lambda}{5}$$

A suitable form of discriminator arrangement which avoids this limitation on aerial spacing utilising more than four aerials will now be described in relation to Figure 2 of the accompanying drawings, which shows the arrangement of Figure 1 in more detail as regards the discriminator 3. The blocks are given the same designations as in Figure 1, the discriminator arrangement being shown in block schematic from within the broken line rectangle 3 and the antenna system and switching or commutation arrangement being collectively indicated by block 8, the outputs from five aerials being represented and connected to a common point. By this means the aerial spacing can be increased beyond $\lambda/5$ only because the differential delay of the discriminator paths equals the time of operation of one aerial. As will be seen hereinafter, the differential delay output of the two paths contains phase steps which are differential adjacent phase steps of the original modulation.

Block 9 represents a constant frequency oscillation generator of known type, for example a crystal controlled generator, giving in its output frequency F. Block 10 represents a modulator or detector stage to which is fed the phase modulated wave from the output of the amplitude limiter 2 at frequency $f$. The stage 10 gives in its output the frequencies $(f+F)$ and $(f-F)$ which are fed to filter represented by block 11 and which passes either frequency $(f+F)$ or $(f-F)$ to a second modulator or detector stage represented by block 12, which is also fed directly with frequency $f$ from the amplitude limiter 2. The second modulator or detector 12 gives in its output sum and difference frequencies among which is either $(f-F)-f=-F$ when filter 11 passes $(f-F)$ or $(f+F)-f=F$ when filter 11 passes $(f+F)$. Frequency F in the output of the second modulator 12 is selected and passed by filter represented by block 13.

It should be noted that filter 11 must select one sideband only, either $(f-F)$ or $(f+F)$, for the sense of phase modulation of the output from the second modulator 12 at frequency F depends upon which sideband is selected. If both side bands were passed by 11 the combined outputs will cause mutual interference and deep amplitude modulation.

The output at frequency F from filter 13 is fed to the frequency discriminator or phase demodulator represented by block 14 which yields a low frequency wave corresponding to the frequency or phase modulation of the output from the amplitude limiter 2.

It will be observed that the waves in the output of the amplitude limiter 2 are divided into two portions, one fed directly to the second modulator 12 and the other via the first modulator and filter 10, 11 to the second modulator 12. These two paths have a differential delay or transit time. The frequency is displaced in the path 10—11 by a constant amount and recombination of the waves from the two paths in the modulator or detector stage 12 provides in the output thereof a phase-modulated wave, (modulation being the differential modulation of signals from the two paths), of constant mean frequency which is demodulated by the normal type of phase demodulator or frequency discriminator 14.

Preferred practical forms of items 6 and 7, of Fig. 1 are the following:

6 is a stable source of oscillation, for example, a crystal controlled oscillator, the output of which is fed to item 7 which may be a multivibrator type circuit adapted to produce pulses of rectangular wave form of the required duration of an antenna commutating pulse. The said pulses are passed through a passive delay network or artificial line represented by block 15 Figure 2 from which tapping points D1–D5 provide the necessary system of time phased pulses for antenna commutation. This arrangement avoids the use of a plurality of electronic devices and provides the necessary pulses at stable intervals of time. Using this arrangement, it is possible to leave small time intervals between the various pulses, so that selective circuits of the receiver do not cause overlap between signal pulses before subjection to the receiver limiter 2, hence the phase transients are made independent of signal amplitudes. If desired, feedback from the delay network 15 may be used to stabilise the frequency of oscillation of the square pulse generator multivibrator circuit 7 as indicated in broken line 16.

Another very suitable form of commutating arrangement for the commutation of the aerials is shown in block schematic in Figure 3. This arrangement will be described on the assumption that there are eight aerials A1–A8 having corresponding series connected crystal detectors D1–D8.

Referring to Figure 3, the block 17 represents a square wave oscillation generator, for example of the multivibrator type of circuit, or a sinewave oscillator followed by a squaring arrangement, for example an amplifier limiter. To take a concrete example, the generator 17 produces waves having a frequency of 33.3 kilocycles per sec. The output of 17 is fed to a differentiating circuit represented by block 18 and the negative pulses of the differentiation product are eliminated in known manner, for example, by means of a rectifier, thus producing a train of short positive pulses at 30 micro-second intervals which is fed to a frequency divider circuit represented by block 19. The frequency divider may comprise any well known multivibrator circuit and the train of positive pulses from 18 is applied to synchronise the multivibrator circuit on the eighth subharmonic (there being eight aerials) of the repetition frequency of the pulses, namely $$\frac{33.3}{8}\text{ kcs.}=4.16\text{ kcs.}$$

and pulses are derived in the output of 19 at this repetition frequency, having a spacing period of 240 microseconds. The pulse train in the output of 19 is applied to trigger the first of a series of eight Kipp relays, that is multivibrator circuits arranged to have one stable and one unstable condition and which define time periods of 30 microseconds. That is to say, after being triggered from its stable to its unstable condition, the relay automatically returns to its stable condition at the end of 30 microseconds. These relays are represented in Figure 3 by the blocks K1 . . . K8, there being one for each aerial A1–A8. A pulse, obtained from one relay is applied to trigger the next in the series as indicated by the series or cascade connection of the blocks K1–K8.

As described up to this point, the 30 $\mu$-second intervals defined by the Kipp relays K1–K8 are not exactly equal, as they depend upon the individual adjustments of each relay. In order to stabilise these 30 $\mu$-sec. intervals, the pulse train of 30 $\mu$-sec. intervals developed by the differentiator 18 is introduced to all of the relays K1–K8 in such sense as to encourage triggering towards their stable states. Initially, the natural periods of the relays are adjusted to be rather greater than 30 μ-sec. (say 35–40 μ sec.), and the 30 μ-sec. train is used to accelerate and control the exact instants of return to stable equilibrium. As only one relay can be undergoing an active cycle of operation at one time, only one relay is returned to stable equilibrium by one pulse. The action of return triggering of this relay produces the start triggering of the next relay, which is in turn restored to equilibrium by the next pulse.

In a preferred arrangement the relays each comprise a single multi-grid valve whose electrodes are inter-connected as a Kipp relay.

The square wave form of the output of the relays, it will be observed has an on-off ratio of 1:7, and the commencement of the "off" period of one coincides exactly with the commencement of the "on" period of the next successive one as indicated at $20_1$–$20_8$.

The pulses $20_1$–$20_8$ are applied at suitable energy level to the respective crystal detectors D1–D8, thereby switching the associated antennae A1–A8 onto the receiver in succession for periods of 30 microseconds each, every 240 microseconds. Thus a cyclical switching of the aerials is achieved at an overall frequency of 4.16 kcs.

The aerials A1–A8 are in general at varying path lengths from the transmitting beacon and thus a sudden change in phase of the radio frequency carrier wave is achieved when one antenna is switched off coincident with the switching on of the next antenna in order.

The output of the frequency divider 19 is used as the comparison wave and may be passed through a filter to produce a sine waveform or undergo other treatment depending upon the type of phase comparer 5 employed.

The most practical form of detector for the antenna switching detectors $D_1$ $D_2$ $D_3$ etc. depends upon the frequency band on which the system is to operate.

On very short wavelengths, it is necessary to provide a signal path of very low impedance during the pulse, but it must not provide a path due to self capacity when the pulse is not present. For this reason, it has been found that the detecting crystal offers the most practical solution. Typical figures for a suitable crystal for antenna commutation on frequencies of about 100 mc./sec. are:

Resistance 200 ohms (positive bias) and 2000 ohms (negative bias).
Capacity 1μμf.=1500 ohms reactance.

A crystal detector is connected between each aerial and its associated transmission line and also between each transmission line and its junction to other lines. By this means and the use of some resistance shunt across each line the effective "on-off" (amplitude) ratio of the received waves from each aerial is much improved, and the receiver is always connected via a single transmission line to a single antenna, avoiding loading of the receiver input by a number of lines and possible short-circuit at some frequencies.

On longer wave-lengths, diode detectors will be found most suitable as D1–D8 for antenna commutation as the higher self-capacity (for a given conductivity) provides only a very small leakage path, and the resistive leakage is much less than that of the crystal detector.

The method of connection of the antenna switching detectors should preferably be such that when the detector is non-conducting, the aerial itself is not only disconnected from the receiver, but also prevented from reflecting signals, with resultant inter-action with another of the aerials which is being used. One practical form of aerial and switching detector is shown as Fig. 4. This aerial is illustrated as a "folded monopole" A which has a vertical height of λ/4 for the preferred working frequency. When the detector D is non-conducting, the aerial is disconnected from the line, and left as an open-circuited quarter wave line which is incapable of absorbing or reflecting the signal wave. 21 is the transmission line connecting the aerial A to the common junction J and is shown as a coaxial line. A condenser 22 is inserted between the crystal detector D and the line 21. The appropriate time phase pulse from the phased pulse producer 7 Fig. 1 is applied across the crystal detector D by the lead 23 through a resistance or choke 24 as shown.

*Ultra high frequency direction finding system*

In a direction finder which is to operate over a frequency range, of, say, 100 mc./sec. to 150 mc./sec. it is quite practical to use a group of aerials arranged in a circle of diameter λ or even 2λ, when it becomes necessary to use a total of about 8 aerials, and about 12 aerials, respectively, when the effect of obstacles at the receiving site is far less error-producing than for the normal Adcock system.

At such frequencies, the pass-band of a normal receiver is about 100 kc./sec. which imposes a "time of response" of about 10μ sec. A practical time of operation of each aerial corresponding to this response time is 30 μ sec. So that for the 8 antenna system, the cyclic period is 240 μ sec. and cyclic frequency of modulation a little over 4 kc./sec. Such a frequency of commutation is very convenient, as commutation produces a negligible interference with reception of speech signals, so that station identification and traffic working can be achieved simultaneously with direction finding.

*Long wave direction finding system*

The arrangements hereinbefore described provide a much-improved automatic direction finder system for use with long waves, particularly in cases where antenna space is limited, as on a mobile vehicle. The normal Adcock system is unsuitable when antenna spacing is a very small fraction of the operating wavelength, as the differential signal from two accidentally unequal antennae is no longer a measure of phase difference. In the arrangements according to the present invention, no such limitation is imposed, for unequal signals are rendered equal by the action of the receiver limiter 2.

Speed of antenna commutation must, of course, be much reduced, as compared with ultra high frequency working, but the reduced commutation speed is still consistent with the accepted standards of receiver selectivity for such frequencies.

In a long wave system, the antenna commutating diodes D will normally be connected in series with aerials A which are tuned in turn by the same reactive network. In practice, since all aerials are ultimately connected by the same line from the junction J to the receiver amplifier 1, each aerial A is connected through a diode D of low impedance to the matching network or first tuned circuit of the receiver, so that each aerial is tuned by the same network. Hence, tuning error does not produce relative phase displacement of signals from the various aerials, and no direction finding error can arise.

*Radio navigational beacons—general*

It will be understood by those skilled in the art, that the antenna commutated beacon is identical in principle to the antenna commutated direction finding system. When a transmitter is commutated to a plurality of aerials, the signal received at any location in space bears the same modulation that would appear in the receiver if receiver and transmitter were to be interchanged in position. Thus, the automatic direction finding system already described is readily converted to an omnidirectional beacon by substituting a transmitter for the receiver. It is, however, necessary to transmit a "reference signal" for phase comparison with the modulation of the received signal.

There is one other feature in which beacon and direction finder systems are liable to differ. In the case of direction finding it will rarely, if ever, be of advantage to connect the receiver to aerials through transmission lines of different electrical lengths. In the case of the beacon, however, it may be of advantage to use different lengths of line in order to set up a course line which is not exactly at right angles to a broadside array of aerials. For example, in setting up a "glide-path" for aircraft, it is not necessary to make a "broadside array" of aerials inclined at a very small angle from the vertical: it is more practical to place all aerials at ground level and to phase them in such manner that no phase modulation occurs along the length of a glide-path of very small inclination to the horizontal.

The same precautions are necessary for avoiding interaction between aerials, as for the direction finding system. When aerials are disconnected from the transmitter, they must be incapable of absorbing or reflecting energy from other aerials.

The crystal detector is, of course, not capable of handling large powers, so another technique becomes necessary. Suitable diode switching detectors could be made, though large currents must be passed, and further, inability to handle the complete power would render them liable to generate harmonics of the transmitter, and to radiate them. A slight practical disadvantage is that a rather large power is required for the various switching pulses. Despite these factors, it is, however, reasonably practical to use switching diodes, particularly if they may be connected in pairs "back to back" in the signal paths to the aerials, permitting a substantial saving of pulse power, and a substantial reduction of necessary diode emission. It is, of course, possible to use a separate amplifier, which is easily pulse modulated, for each aerial. A very suitable amplifier for the lower radio frequencies is the well-known cathode follower. At higher frequencies, when the cathode follower is not effective, then the grounded-grid amplifier may be used. In the latter case, the grid is grounded for radio frequency potentials, but may be "pulsed" for aerial switching.

The preferred form of ultra high-frequency switching is, however, a triode valve which is arranged, not as an amplifier, but simply as a variable impedance in series with the transmitter feed to the aerial. This triode (or in some cases, pair of triodes) has its anode and grid strapped together for R. F. potentials, and the cathode to anode impedance is used very much as the cathode to anode impedance of the diode. One advantage of this system is that only a small pulse power is required for impedance modulation.

Another frequent difference between beacon and direction finding technique is the following (though direction finding systems could in some cases use the technique with advantage). In cases where the beacon (or direction finder) is to serve only part of space, then it is desirable to concentrate transmitted energy into that space. Individual aerials of the beacon (or D. F.) may with advantage be designed to have the requisite directive energy distribution pattern. The individual directive patterns, should, of course, be of very similar shape and strength, in order that unwanted amplitude modulation of the signal shall not be caused.

Still another differentiating aspect of the beacon is that it is often required to radiate intelligence other than bearing information. All of the beacons to be described hereinafter may radiate speech or other intelligence by simple amplitude or frequency modulation of the whole transmission. In the case of amplitude modulation of the transmitter for example by speech, this is demodulated before subjection to the receiver limiter, where the speech modulation is removed before directional information is determined.

Figure 5:
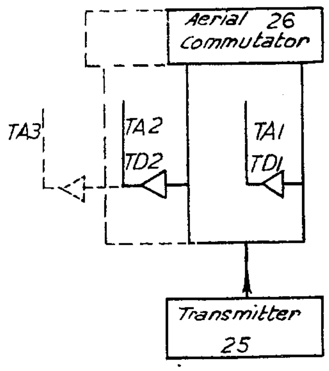
Figure 5 is an embodiment of the invention in which the phase modulation is effected at the transmitter, namely a blind approach path beacon.

Figure 5 shows diagrammatically a simple beacon giving a single azimuth course line and embodying the present invention. In Figure 5 a transmitter, represented by block 25 is used to excite two aerials TA1 and TA2 in turn by means of a commutating arrangement as hereinbefore described and represented by block 26 and detectors TD1 and TD2. The wave received by a receiver fed continuously from a single antenna system is equivalent to that which would be received by the equivalent D. F. system namely, the "homing device" hereinbefore described. In order that it shall not be necessary to radiate a separate "sense" signal according to a feature of the present invention the two aerials are excited for unequal periods of time. For this purpose, the commutating arrangement may comprise a pulse generator of rectangular wave form of unequal "on" and "off" periods, the output waves therefrom being applied in reverse phases to the detectors TD1 and TD2 respectively.

In all directions the received wave is substantially unmodulated in amplitude, but undergoes rhythmic phase transients. The phase modulation wave-form is, in fact, in the form of "dot" or "dash" according to sense of deviation from the course line, as will be made clear hereinafter.

A receiver for use with the beacon may comprise, as shown in Figure 6, a single receiving antenna A10 of any desired suitable form, a high frequency amplifier represented by block 27, an amplitude limiter, represented by block 28, a phase or frequency modulation demodulator of normal type used for exampe in frequency modulation broadcast systems, and represented by block 29. Demodulation by such a device gives an output according to the frequency modulation of the received waves, that is, the first differential of the phase modulation.

With the simple two-antenna beacon illustrated in Figure 5 the output from the discriminator 29 would be somewhat as shown in curve *b*, Figure 7. Curve (*a*) Figure 7 represents the original phase modulation for "dots." The signal represented by curve *b* may be integrated to provide the wave form shown in curve (*c*) Figure 7 which is applied to a centre zero indicating instrument of known type usually employed on receivers of complementary conjugate dot-dash approach path systems. However, as will be seen hereinafter, more than two aerials may be more efficiently employed, in which case the phase modulating wave form of the signal would be as shown in curve (*d*) and output wave from the discriminator 29 would appear somewhat as shown in curve *e*, Figure 7. This form would be suitable for application to a balanced square law detector to yield positive or negative D. C. output which is applied to an indicator. This arrangement is represented by block 30 in Figure 6. When meter indication of the course is required, the dot and dash signals represented in curve *c*, Figure 7 (dot signals) may be converted to positive and negative direct currents according to any known method used in blind approach systems utilising overlapping beams with complementary conjugate dot dash signals, for example as described in U. S. Patent No. 2,431,317, dated November 25, 1947. Such arrangements may be represented by block 30 which generally represents the indicator circuit arrangement.

When an amplitude modulation speech channel is provided a portion of the output from the high frequency or intermediate frequency amplifier 27 is fed to the amplitude modulation demodulator represented by block 31, the output of which is fed to a translation device represented by head-phones 32.

It may be noted that the normal frequency discriminator gives maximum output when phase modulation transients equal 90°. If the two aerials are spaced at $$\frac{\lambda}{4}$$

then the course line appears at right angles to the line of aerials, and a meter-operated course meter gives an output which increases progressively according to deviation from the course line right up to the end-on position.

As the normal discriminator gives zero response for a phase transient of 180 degrees, a false course line appears for antenna spacing greater than $$\frac{\lambda}{2}$$

so that the best accentuation of a single course line without false courses is provided by antenna spacing just short of $$\frac{\lambda}{2}$$

For this simple 2-antenna beacon, aerials may be keyed by separate amplifiers or other electronic keying device, the "keying" or modulating waves being provided by a simple multi-vibrator or unequal on-off ratio as already stated.

The course line is more easily detected by the normal frequency modulation discriminator receiver when a third aerial is added at the transmitter as shown in broken line in Fig. 5. For example, if three aerials are arranged in line, TA1, TA2, TA3, making $$TA1-TA2=\frac{\lambda}{8}$$

and $$TA2-TA3=\frac{\lambda}{8}$$

then the phase modulation pattern is according to Figure 7 (*d*), and output from the frequency discriminator 29, Fig. 6, is as shown in curve (*e*), Fig. 7, for "dash" signals. The reversed curve would be obtained for "dot" signals, when the beacon aerials TA1, TA2, TA3 are excited for equal intervals of time in the sequence TA1, TA2, TA3, TA1, TA2, TA3, etc. Differentiation of the phase modulation by the frequency discriminator 29 gives the wave-form of curve *e*, Fig. 7. Subjection of this wave *e* to a course meter circuit 30 in the form of a square-law bridge rectifier or to a biassed bridge rectifier gives a negative D. C. output, owing to the accentuated negative peak. The inverted partner wave curve (*e*) as received on the other side of the course line gives a corresponding positive D. C. output.

Figure 8 shows by way of example the transmitter beacon arrangement for a single course line of high precision embodying the present invention.

The transmitting antenna system comprises a plurality, greater than two, and five in fact being shown, of aerials TA11–TA15, each having connected in series therewith a respective switching rectifier TD11–TD15. Each of the aerials is connected through its respective switching impedance TD11–TD15 to a transmitter equipment represented by block 33 through a respective phase adjusting network PN11–PN15. These latter are so adjusted that the energy fed from 33 is in phase at all the aerials.

The aerials are arranged in line broadside to the required course line. The aerials are excited in turn, first from TA12 to TA15 (i. e. left to right) or vice versa, for equal small intervals of time and then in the reverse direction, from TA14 to TA11 or vice versa, for larger intervals of time. To this end, two commutating arrangements are provided and may be as described in connection with Figure 2 or 3, using the delay network or series of Kipp relays. In either case the commutating devices are represented in Figure 8 by the blocks 34 and 35.

In the arrangement illustrated Kipp relays represented by blocks 36 and 37 are arranged to produce, on operation pulses of substantially square waveform, the pulse from 37 being of longer duration than the pulse from 36 as depicted at 38 and 39 respectively.

It should be observed that aerial TA15 is controlled by a pulse from commutator 34 only and aerial TA11 is controlled by a pulse from commutator 35 only, but aerials TA12, TA13 and TA14, that is the intermediate aerials, are controlled by pulses from both commutators 34 and 35 in proper sequence.

When 34 and 35 represent delay networks, a pulse delayed by a time interval equal to the duration of pulse 47 is obtained from 34 and applied to trigger the Kipp relay 37 whose output pulse 38 is of longer duration than 39 and is applied to the input of delay network 35 and also to control aerial TA14. Pulses are obtained from suitable tapping points TP3, TP2 and TP1 such that the interval between the pulses is equal to the duration of the pulses. These pulses are applied to control the respective aerials TA13, TA12 and TA11. A pulse obtained from tapping point TP0 on 35 is such that the pulse obtained thereat is delayed behind the pulse obtained from TP1 by an interval equal to the pulse 38 duration, is applied to trigger the Kipp relay 36 which produces the shorter pulses 39. These pulses are applied to the input of delay network 34 and directly to control aerial TA12. Pulses delayed by time intervals equal to the duration of pulse 39 are obtained from tapping points TK3, TK4 and TK5 for controlling aerials TA13, TA14 and TA15. A pulse from TK6 on delay network 34 is applied to trigger Kipp relay 37 and the action of the commutator repeats the cycle as described.

When blocks 34 and 35 represent series of Kipp relays, the output from the last relay of 34 is applied to trigger the first relay of series 35, and the output of this first relay is applied to control TA14. The outputs from the second, third and fourth relays are applied to control respectively TA13, TA12 and TA11. The output from the fourth relay of 35 is applied to trigger the first relay of series 34 whose output is applied to control TA12. Likewise the outputs of the second, third and fourth relays of 34 control respectively TA13, TA14 and TA15. The output from the fourth relay of 34 is applied to trigger the first of relay 35 and the cycle described is repeated.

The receiver employed with a beacon as described with reference to Figure 8, will be the same as the receiver described with reference to Figure 6.

Adjacent aerial spacing must not exceed $$\frac{\lambda}{2}$$

and is preferably not much greater than $$\frac{\lambda}{4}$$

When aerials are excited from a common continuous wave source, via equal paths from the source, no modulation appears in a direction at right angles to the array.

Off course, the received signal is modulated in phase according to curve *a*, Fig. 9, or the same wave-shape inverted in sense, according to sense of displacement from the course line.

In a practical case of many steps (i. e. many aerials), the phase modulation curve obtained in a receiver of restricted band width will follow the smoother curve *b*, Fig. 9, and differentiation by the frequency demodulator in 29, Fig. 6, yields the wave-shape of curve *c*, Figure 9, i. e. dashes for one side of course line, and dots for the other, and may be applied directly to indicator circuit 30.

Alternatively, for fewer aerials, and using a moderately broad-band receiver, and broad-band frequency demodulator, the phase modulation curve, curve *a*, Figure 9, will produce in the output of the discriminator 29 the wave form (*d*) Figure 9, which after slight integration produces the wave form (*c*) Figure 9. The integrating circuit may in this instance be a low pass filter.

The arrangement described in connection with Figure 8 also provides a practical form of glide-path beacon utilising an array of horizontal radiators, each placed very close to the ground (say at $$\left.\frac{\lambda}{2}\right)$$

As, however, it is not desired to set up a vertical course line, the feeder lengths from transmitter to the various aerials progressively increase from one end of the array to the other in which case the phase adjusters PN11–PN15 may be omitted, or alternately may be used to adjust the path. Zero phase modulation is produced in space over the surface of an acute angled cone whose horizontal axis is the line of the aerial array.

This conical surface can, of course, be made to intersect a vertical plane defined by an azimuth system, hence defining a pre-determined single glide-path.

In the case of a glide-path beacon, it is not entirely necessary to avoid false courses at angles very far removed from the correct course, as owing to excessive "steepness" these false courses could not be mistaken by the pilot of an aircraft. Hence, antenna spacing is not limited to a miximum of $$\frac{\lambda}{2}$$

and the total number of antennae necessary for a good accentuation of course is not large.

An omnidirectional beacon embodying the invention is illustrated in Figure 10 and the receiver for using the beacon for determining bearing is illustrated in Figure 11.

The beacon illustrated in Figure 10 is very similar to the equivalent omnidirectional automatic direction finder illustrated in Figure 1 and it is considered not necessary to give considerable detail.

A plurality of aerials, eight shown in Figure 10, TA21–TA28 are arranged at uniform intervals on the circumference of a circle and are commutated or keyed in rotary succession for equal intervals of time, as in the commutator arrangement described in connection with Figure 2 or 3. Such arrangement is represented in Figure 10 by the block 40, from which phased pulses of rectangular wave form are applied to respective keying rectifiers e. g. diodes D21 to D28, connected in series with respective aerials, to allow the passage of energy in cyclical succession from a transmitter represented by the block 41. As will be observed from Figure 10 the transmitter 41 is connected to each aerial by the same length of transmission line and all the aerials are thus fed with cophasal energy.

The waves from the beacon of Figure 10 received at any point in space is thus frequency modulated at the commutation rotation frequency of the beacon, and the phase of the modulation varies linearly according to the bearing of the receiver with respect to the beacon. In order to obtain a direct reading of the bearing it will be necessary to transmit from the beacon some reference signal from which a comparison wave may be obtained at the receiver. This may be attained by any of the known methods, for example:

1. Synchronising pulses may be transmitted from the beacon either as positive pulse of increased radiation, or a negative pulse of momentary reduction or interruption of transmission, when the transmitter in a specified geographical location is excited.

2. Amplitude or phase modulation of the transmitted carrier wave from the beacon at half the rotary commutation frequency of the beacon. A comparison wave of correct frequency may be obtained at the receiver by doubling the amplitude or phase modulation frequency received.

3. A separate carrier wave may be radiated from the beacon and modulated in any manner by a comparison wave which can be obtained in known manner at the receiver. This separate carrier may also be used to heterodyne the main beacon transmission in the receiver, hence converting the received waves to a frequency which enables a very stable frequency demodulator to be used.

A form of receiver for use with the beacon of Figure 10 is shown in Figure 11. In this figure the receiving antenna is indicated at A11 and as in the case of Figure 1, the output from A11 is fed to a high frequency amplifier represented by block 42, an amplitude limiter represented by block 43, phase discriminator represented by block 44, filter represented by block 45, and the phase comparing circuit and indicator represented by block 46. A circuit arrangement for producing a comparison wave depending upon the method used as hereinbefore referred to is represented by block 47 and the output of 47 is fed to the phase comparing arrangement 46 in well-known manner.

If a speech or other signal channel is superimposed on the beacon transmission as an amplitude modulation, an amplitude demodulator may be fed with a portion of the output from the high frequency amplifying stage 42 as in the case of Figure 6. In the case of a frequency or phase modulation the signal frequencies may be filtered out from the output of the discriminator 44 in known manner.

It will be observed that the output from the discriminator 44 will have a wave form similar to curve (*a*), Figure 9, except that the steps are equal in the amplitude increasing and decreasing direction. The output of the filter D is a smooth substantially sinusoidal wave.

Whilst several embodiments of the invention have been described it will be understood that details in each one may be modified without departing from the spirit and scope of the invention.

What is claimed is:

1. A radio blind approach system comprising a transmitter beacon having an array of at least three aerials in alignment arranged broadside to the desired approach path, means for energising said aerials successively first in one direction for equal periods of time and then in the reverse direction for equal longer periods of time, and a receiver for receiving the waves radiated by said beacon, means for amplitude limiting said received waves, a phase or frequency discriminator, and an indicator circuit and means for applying said limited waves through said discriminator to said indicator circuit.

2. A radio glide-path system comprising a transmitting beacon having an array of at least three aerials in alignment parallel to the ground, means for energising said aerials with appropriately phased energies successively first in one direction for equal periods of time and then in the reverse direction for equal longer periods of time, and a receiver for receiving the waves radiated by said beacon including an amplitude limiter, a phase or frequency discriminator and an indicator circuit to which the output of the discriminator circuit is applied.

3. A radio navigational system as claimed in claim 2 wherein said indicator circuit comprises a centre zero indicating instrument.

4. A radio navigational system as claimed in claim 2 wherein said means for energising said aerials comprises two commutator switching arrangements, one designed to provide phased pulses having a duration equal to said first mentioned equal periods and the other designed to provide phased pulses having a duration equal to said longer periods, means for applying the phased pulses to respective devices to connect said aerials to the beacon transmitter cyclically and successively in forward and reverse directions, and means for applying the last pulse of one commutator arrangement to start the other commutator arrangement in operation.

5. A direction finding or bearing determining system comprising an omnidirectional beacon having at least three aerials arranged equidistantly around the circumference of a circle, and means for feeding said aerials with energy for transmission for equal short periods of time cyclically and successively, means for transmitting a signal when the cycle of aerial feeding passes through a predetermined phase, means for receiving said transmitted energy and signal, means for amplitude limiting and phase detecting said received energy, a filter to which the output of said means for discriminating is applied, means for deriving from said received signal, a comparison wave, a phase comparing circuit comprising an indicator and means for applying to said phase comparing circuit the said comparison wave and the output from said filter.

6. A system as claimed in claim 5 wherein said commutator arrangement comprises a plurality of one way detector devices each connected in series with respective aerials between said aerials and the transmitter, means for generating a train of pulses of rectangular wave form whose durations are equal to the period desired for connection of said aerials to the transmitter and having a repetition frequency equal to the commutation cycle, means for producing from said train other pulse trains time phased with respect to each other, and means for applying said time phased trains to respective ones of said detector devices to render these latter conducting cyclically and successively to make connection between said aerials and the transmitter for said period.

7. A system as claimed in claim 5 wherein said commutator arrangement comprises a plurality of one way detector devices each connected in series with respective aerials between said aerials and the transmitter, a series of Kipp relays connected in cascade so that the output of one triggers the next in succession and the output of the last triggers the first, means for applying the output pulses obtained from the relays to respective one way detector devices to render these latter conductive cyclically and successively and connect said aerials to the transmitter, said Kipp relays being so designed as to produce output pulses equal to the period desired for connection of said aerials to the translating device.

CHARLES WILLIAM EARP.
CHARLES ERIC STRONG.

REFERENCES CITED

The following references are of record in the file of this patent:

UNITED STATES PATENTS

| Number | Name | Date |
|---|---|---|
| 2,014,732 | Hansell | Sept. 17, 1935 |
| 2,081,530 | Dowsett et al. | May 25, 1937 |
| 2,210,651 | Busignies | Aug. 6, 1940 |
| 2,284,475 | Plebanski | May 26, 1942 |
| 2,403,727 | Loughren | July 9, 1946 |
| 2,411,518 | Busignies | Nov. 26, 1946 |